United States Patent
Ioffe et al.

(10) Patent No.: US 12,526,729 B2
(45) Date of Patent: Jan. 13, 2026

(54) SYSTEMS AND METHODS FOR SUPPORTING EVOLVING BAND REGULATIONS

(71) Applicant: Apple Inc., Cupertino, CA (US)

(72) Inventors: Anatoliy Sergey Ioffe, Sunnyvale, CA (US); Daniel Popp, Munich (DE); Elmar Wagner, Taufkirchen (DE); Fucheng Wang, Cupertino, CA (US); Alexander Sayenko, Munich (DE)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 18/464,954

(22) Filed: Sep. 11, 2023

(65) Prior Publication Data

US 2023/0422152 A1 Dec. 28, 2023

Related U.S. Application Data

(60) Division of application No. 17/902,526, filed on Sep. 2, 2022, which is a continuation of application No. 17/512,462, filed on Oct. 27, 2021.

(Continued)

(51) Int. Cl.
*H04W 36/00* (2009.01)
*H04W 48/08* (2009.01)
(Continued)

(52) U.S. Cl.
CPC ....... *H04W 48/08* (2013.01); *H04W 52/0212* (2013.01); *H04W 72/51* (2023.01); *H04W 16/14* (2013.01); *H04W 84/042* (2013.01)

(58) Field of Classification Search
CPC . H04W 48/08; H04W 72/51; H04W 52/0212; H04W 16/14; H04W 84/042;
(Continued)

(56) References Cited

U.S. PATENT DOCUMENTS

| | | | | |
|---|---|---|---|---|
| 5,771,453 A | * | 6/1998 | Haartsen | H04W 12/06 |
| | | | | 455/406 |
| 8,565,107 B2 | * | 10/2013 | Pease | H04W 48/08 |
| | | | | 370/252 |

(Continued)

FOREIGN PATENT DOCUMENTS

| | | |
|---|---|---|
| CN | 102014447 A | 4/2011 |
| CN | 102740464 A | 10/2012 |

(Continued)

OTHER PUBLICATIONS

New FCC rules for 3700-3980MHz, Mar. 3, 2020, 258 pages.
(Continued)

*Primary Examiner* — Amancio Gonzalez
(74) *Attorney, Agent, or Firm* — FLETCHER YODER PC

(57) ABSTRACT

A base station may send an indication of frequency subranges supported by the base station to user equipment, which may respond with an indication of the frequency subranges that are also supported by the user equipment. Additionally, a Spectrum Access System (SAS) controller, using environmental sensing capability sensors, may determine whether non-federal networks are disposed in a coverage area of a base station and neighboring coverage areas. If so, then the SAS may indicate to the base station to send an indication to user equipment in the coverage area to operate using a default power mode. Otherwise, the SAS may indicate to the base station to send an indication to the user equipment to operate using a lower power mode. Moreover, a base station may indicate a regulatory requirement to user equipment using network signaling value of multiple network signaling values corresponding to multiple regulatory requirements of multiple geographical regions.

20 Claims, 8 Drawing Sheets

Related U.S. Application Data

(60) Provisional application No. 63/185,115, filed on May 6, 2021.

(51) Int. Cl.
  *H04W 52/02* (2009.01)
  *H04W 72/51* (2023.01)
  *H04W 16/14* (2009.01)
  *H04W 84/04* (2009.01)

(58) Field of Classification Search
  CPC . H04W 36/08; H04W 72/0453; H04W 48/12; H04W 52/367; H04W 72/20; H04W 8/24; Y02D 30/70
  USPC ...... 455/418, 436, 442, 432.1, 435.1, 422.1, 455/414.1; 370/331
  See application file for complete search history.

(56) References Cited

U.S. PATENT DOCUMENTS

| | | | | |
|---|---|---|---|---|
| 8,818,433 | B2* | 8/2014 | Steer | H04W 72/044 455/518 |
| 10,599,309 | B2* | 3/2020 | Pai | G06Q 10/10 |
| 10,834,131 | B2* | 11/2020 | Syvänne | H04L 63/0227 |
| 11,159,302 | B2* | 10/2021 | Jung | H04W 72/0453 |
| 11,310,067 | B1* | 4/2022 | Panthi | H04B 7/1851 |
| 11,452,032 | B2* | 9/2022 | Gupta | H04W 48/10 |
| 2007/0155374 | A1* | 7/2007 | Yang | H04L 63/107 455/421 |
| 2008/0037490 | A1* | 2/2008 | Hughes | H04W 48/08 370/338 |
| 2014/0114823 | A1* | 4/2014 | Pai | G06Q 40/123 705/31 |
| 2014/0214637 | A1* | 7/2014 | Pai | G06Q 40/123 705/31 |
| 2015/0146627 | A1* | 5/2015 | Ananda | H04W 48/16 370/329 |
| 2016/0142976 | A1 | 5/2016 | Li et al. | |
| 2017/0237182 | A1* | 8/2017 | Tran | H01Q 21/0025 343/853 |
| 2018/0007641 | A1 | 1/2018 | Vishwanathan et al. | |
| 2019/0281543 | A1* | 9/2019 | Hong | H04W 48/20 |
| 2019/0281604 | A1 | 9/2019 | Kim et al. | |
| 2019/0394690 | A1 | 12/2019 | Shih et al. | |
| 2020/0045731 | A1 | 2/2020 | Yiu | |
| 2020/0145177 | A1 | 5/2020 | Jung et al. | |
| 2020/0236696 | A1 | 7/2020 | Takahashi et al. | |
| 2024/0040483 | A1* | 2/2024 | Fan | H04W 48/16 |

FOREIGN PATENT DOCUMENTS

| | | |
|---|---|---|
| CN | 104144447 A | 11/2014 |
| CN | 106160985 A | 11/2016 |
| CN | 107113748 A | 8/2017 |
| EP | 3703424 A1 | 9/2020 |
| EP | 3927105 A1 | 12/2021 |
| WO | 2018136298 A1 | 7/2018 |
| WO | 2020069174 A1 | 4/2020 |
| WO | 2021196001 A1 | 10/2021 |

OTHER PUBLICATIONS

New FCC rules for 3450-3550MHz, Mar. 18, 2021, 113 pages.
R4-2006624, "Band n77 usage in the US", Apple, May 25-Jun. 5, 2020, 5 pages.
R4-2107109, "Band n77 usage in the US for 3.45 to 3.55 GHZ," Apple, Apr. 12-20, 2021, 4 pages.
R4-2105439, "WF on Enabling US 3.45-3.55GHz in Band n77," Apple, May 19-27, 2021, 12 pages.
R4-21Xxxxx, "Addition of 3.45-3.55 GHz and modifiedMPR behavior in Band n77 for the US," Apple, Skyworks Solutions Inc., T-Mobile USA, May 19-27, 2021, 12 pages.
R4-2008897, "Addition of UE coexistence between US bands and NR Band n77," Qualcomm Incorporated, Verizon, T-Mobile USA, AT&T, Apple, May 25-Jun. 5, 2020, 26 pages.
Nokia et al.: "Clarification on NS-203 support by N258", 3GPP Draft; R4-2100085, 3rd Generation Partnership Project (3GPP), Mobile Competence Centre; Vo. RAN WG4, No. Online; Jan. 25, 2021-Feb. 5, 2021; Jan. 15, 2021 (XP051969316); [retrieved Jan. 15, 2021 from internet: https://ftp.3gpp.org/tsg_ran/WG4_Radio/TSGR4_98_3/Docs/ R4-2100085.zip].
"Foreword"; 3GPP Draft; Draft_36101-H10, 3rd Generation partnership Project (3GPP), Mobile Competence Centre, France; Mar. 29, 2021 (XP051991072) [retrieved Mar. 29, 2021 from internet: https://ftp.3gpp.org/tag_ran/WG4_Radio/Draft%20Specs/After_RAN-91e/draft_36101_h10.zip draft_36101-h10_s00-07.docx].
NTT Docomo et al.: "The necessity of UE capability signalling on NS value", 3GPP Draft; R4-1914128, 3rd Generation Partnership Project (3GPP), Mobile Competence Centre, France; vol. RAN WG4, No. Reno, US; Nov. 18, 2019-Nov. 22, 2019, Nov. 8, 2019 (XP051818575) [retrieved Nov. 8, 2019 from internet: https://ftp.3gpp.org/ tsg_ran/WG4_Radio/TSGR4_93/Docs/R4-1914128.zip R4_1914128_The necessity of UE capability signalling for NSvalue_v1.doc].
Office Action for Chinese Patent Application No. 202211101657.8 dated Dec. 31, 2024; 6 pgs.

* cited by examiner

SYSTEMS AND METHODS FOR SUPPORTING EVOLVING BAND REGULATIONS

CROSS-REFERENCE TO RELATED APPLICATIONS

This application is a division of U.S. application Ser. No. 17/902,526, entitled "Systems and Methods for Supporting Evolving Band Regulations," filed Sep. 2, 2022, which is a continuation of U.S. application Ser. No. 17/512,462, filed Oct. 27, 2021, entitled "Systems and Methods for Supporting Evolving Band Regulations," which claims priority to U.S. Provisional Application No. 63/185,115, entitled "Systems and Methods for Supporting Evolving Band Regulations", filed May 6, 2021, each of which is hereby incorporated by reference in its entirety for all purposes.

BACKGROUND

The present disclosure relates generally to wireless communication, and more specifically to evolving and expanded regulations relating to radio frequency bands.

In cellular communication, user equipment (e.g., a cell phone) may communicate (e.g., with a base station) under guidelines or rules that may be set and enforced by regulatory and/or standards bodies, such as the Federal Communications Commission (FCC), the Third Generation Partnership Project (3GPP), European Telecommunications Standards Institute (ETSI), and so on. However, when the guidelines or rules are updated, user equipment configured to operate in accordance with the guidelines or rules prior to the update may not be properly or efficiently operate under the updated guidelines or rules.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for operating user equipment may include detecting a base station via the user equipment, synchronizing the user equipment to the base station, and receiving, at the user equipment, system information from the base station. The system information may include one or more network signaling flags, the network signaling flags indicating frequency ranges supported by the base station. The method may also include receiving, by the user equipment, one or more of the frequency ranges supported by the user equipment corresponding to the one or more network signaling flags. The method may further include sending an indication of the one or more frequency ranges supported by the user equipment from the user equipment to the base station.

In another embodiment, a system may include a base station supporting a non-federal network in a coverage area, user equipment in the coverage area communicatively coupled to the base station, environmental sensing capability sensors that determine whether additional non-federal networks are deployed in neighboring coverage areas with respect to the coverage area, and a Spectrum Access System communicatively coupled to the base station and the environmental sensing capability sensors. The Spectrum Access System may receive indications from the environmental sensing capability sensors as to whether the additional non-federal networks are deployed in the neighboring coverage areas. The Spectrum Access System may further, based on receiving the indications that indicate that the additional non-federal networks are deployed in the neighboring coverage areas, send an indication to the base station that the user equipment is permitted to operate using a default power mode.

In yet another embodiment, a method for operating user equipment may include receiving, at a receiver of the user equipment, a system information block from a base station. The system information block may include a network signaling value of multiple network signaling values corresponding to multiple regulatory requirements of multiple geographical regions. The method may also include receiving, using processing circuitry of the user equipment, a regulatory requirement of the multiple regulatory requirements of a geographical region of the multiple geographical regions corresponding to the network signaling value. The method may further include configuring, using processing circuitry of the user equipment, a transmitter or the receiver of the user equipment to comply with the regulatory requirement.

In another embodiment, a method for operating user equipment in a geographical region includes receiving, at a receiver of the user equipment, a system information block from a base station. The system information block includes a network signaling value of multiple network signaling values corresponding to multiple regulatory requirements of the geographical region. The method also includes receiving, using processing circuitry of the user equipment, the geographical region that the user equipment is located, and receiving, using the processing circuitry of the user equipment, a regulatory requirement of the multiple regulatory requirements corresponding to the network signaling value and based on the geographical region. The method further includes configuring, using processing circuitry of the user equipment, a transmitter or the receiver of the user equipment to comply with the regulatory requirement.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
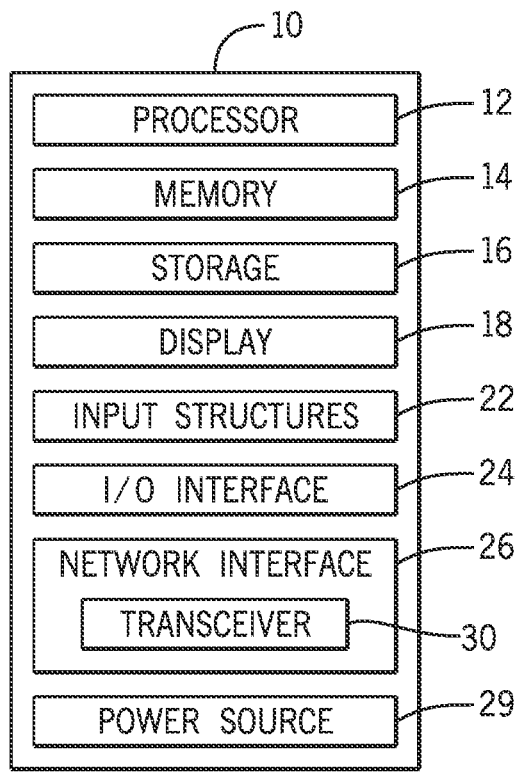
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

In wireless (e.g., cellular) communication, user equipment (e.g., a cell phone, a smartphone, a tablet, a wearable device, a laptop, and so on) may communicate on a channel of a frequency band (e.g., the n77 or 3.7 gigahertz (GHz) frequency band) with a network (e.g., a wireless communication network) through one or more communication nodes (e.g., base stations). In particular, according to the current Third Generation Partnership Project (3GPP) standard, when establishing communication with the network via base station, the user equipment may detect network coverage (e.g., at a cell supported by the base station) and receive system information including a frequency of a channel from the base station. If the user equipment supports the frequency, the user equipment indicates as such to the base station, the network may allocate the channel to the user equipment, noting that the user equipment supports a frequency band (e.g., the n77 band) that includes the frequency of the channel. When performing a handover event (e.g., transferring network coverage of the user equipment from the base station to another base station) or requesting a secondary cell for carrier aggregation, the base station may indicate (e.g., to the other base station or the network) that the user equipment supports the frequency band based on the user equipment indicating that it supports the frequency of the channel.

However, if the frequency band is updated (e.g., to include additional or remove a frequency subrange), and the user equipment is not updated in kind, then communication with the user equipment may become less efficient or fail altogether. For example, the 3GPP currently restricts United States (U.S.) operation of the n77 band to the range of 3.7-3.98 gigahertz (GHz). Thus, user equipment may communicate using the n77 band if it complies with the Federal Communications Commission (FCC) rules governing the 3.7-3.98 GHz range. In particular, user equipment may be tested to confirm compliance with the FCC rules related to operate the 3.7-3.98 GHz range. However, if the 3GPP updates the n77 band to allow an additional range of frequencies, such as the 3.5 GHz subrange (e.g., 3.45-3.55 GHz) in the U.S., at least at the time of that update, currently operating user equipment may not comply with the newly added 3.5 GHz band, as the user equipment may not have been tested, and thus not comply, with the 3.5 GHz subrange.

While this may not cause a problem when the user equipment is initially connecting to the network, because the base station may indicate (e.g., to another base station or the network) that the user equipment supports the n77 band—and not the subrange of the n77 band that the user equipment complies with (e.g., 3.7-3.98 GHz)—to perform a handover event or request a secondary cell for carrier aggregation, the other base station may allocate a channel or the base station may allocate the secondary cell in the 3.5 GHz band for which the user equipment is not compliant. Accordingly, the handover event may fail, in which the user equipment may disconnect from the network, or the secondary cell may not be used by the user equipment, in which the user equipment may not be able to use the full bandwidth allocated to it for communication.

The presently disclosed embodiments enable the user equipment to indicate supported ranges of frequencies to the base station. In particular, when the base station sends system information to the user equipment based on the user equipment detecting network coverage provided by the base station, the system information may include one or more network signaling values indicative of one or more frequency ranges supported by the base station. For example, the one or more network signaling values may include the original 3.7-3.98 GHz frequency subrange of the n77 band, as well as the newly added 3.45-3.55 GHz frequency subrange of the n77 band. The user equipment may respond to the base station by indicating, using one or more modified maximum power reduction (MPR) behavior bits, which of the one or more frequency ranges are supported by the user equipment. For example, the user equipment may indicate that it supports the 3.7-3.98 GHz frequency subrange, but not the 3.45-3.55 GHz frequency subrange. Accordingly, when performing a handover event or requesting a secondary cell for carrier aggregation, the other base station may allocate a channel or the base station may allocate the secondary cell in a frequency range supported by the user equipment. That is, in the above example, the other base station may allocate a channel or the base station may allocate the secondary cell in the 3.7-3.98 GHz frequency subrange.

Additionally, frequency bands may be updated (e.g., by the 3GPP) such that transmission and/or reception specification or requirements may change. For example, the n77 band includes the 3.45-3.55 GHz frequency subrange (the "3.5 GHz subrange"), which initially was used by federal incumbent users and was protected by the FCC by blocking any non-federal communications from occurring on the frequency subrange. The FCC further protected the 3.5 GHz subrange blocking any non-federal communications from occurring on the neighboring subrange of 3.55-3.7 GHz frequency subrange, also known as the Citizens Broadband Radio Service (CBRS) band, if the non-federal communications occurred in the same coverage area as those of the federal users. Moreover, if the non-federal communications occurred in a different coverage area as those of the federal users, then the FCC enforced a power backoff of user equipment on the CBRS band (referred to herein as a "CBRS power backoff") that is greater or "stricter" than a power backoff of the user equipment when not using the CBRS band. This was implemented by setting a network signaling value in a system information block sent from a base station to the user equipment per the 3GPP standard.

However, the FCC recently allowed non-federal networks and users to use the 3.5 GHz subrange in coverage areas where federal users are not using the subrange. That is, the non-federal networks may be deployed using the 3.5 GHz subrange in coverage areas where there are no federal users utilizing the 3.5 GHz subrange. Accordingly, in the case where user equipment is using the CBRS band, and the user equipment is not located in or adjacent to a coverage area where there are federal users using the 3.5 GHz subrange, then the user equipment may not operate to its full communication potential or efficiency, as the FCC regulations may force it to operate with a greater power backoff (e.g., under the assumption that there are only federal users in the 3.5 GHz subrange).

The presently disclosed embodiments enable a Spectrum Access System (SAS) controller that allocates spectrum resources in the CBRS band to determine, using Environmental Sensing Capability (ESC) sensors, whether there are non-federal networks in coverage areas. For a coverage area that has non-federal networks (and thus may not have federal users) and are adjacent to coverage areas that have non-federal networks, the SAS controller may cause base stations in the coverage area to indicate (e.g., disable a network signaling value corresponding to the CBRS power backoff) to user equipment that it may operate using use the CBRS band with a default power backoff (e.g., less than the CBRS power backoff). In this manner, user equipment using the CBRS band may operate to its full communication potential or efficiency.

Moreover, a frequency band may have different regional regulatory specifications or requirements for the same or overlapping frequency subranges in the frequency band. For example, in the newly allocated 6 GHz frequency band, Korea has a low power indoor (LPI) regulatory specification in the 6.425-7.125 GHz subrange, while Brazil has a LPI and very low port (VLP) regulatory specification in the overlapping 5.925-7.125 GHz subrange. Networks may indicate this regulatory specification to user equipment in system information sent by a base station (e.g., via network signaling values). Upon receiving this indication, the user equipment may configure its transceiver to operate using the regulatory specification. However, the 3GPP has only allocated eight network signaling values, and the number of permutations of geographical regions and their regulatory specifications may be much greater than eight. As such, the eight network signaling values may be insufficient to provide the proper regional regulatory specification to the user equipment.

Some of the presently disclosed embodiments enable expanding the number of network signaling values beyond eight to accommodate for the full number of possible regulatory specifications for each geographical region. In additional or alternative embodiments, the eight network signaling values may correspond to regional regulatory specifications of the region that the user equipment and/or the base stations is located. As such, the user equipment may determine its location (e.g., as determined using a location sensor of the user equipment) or the location of the base station (e.g., as received from the base station, and so on), and determine the regulatory specification based on the network signaling value and the location of the user equipment. In this manner, the user equipment may configure its transceiver to operate using the appropriate regulatory specification.

FIG. 1 is a block diagram of an electronic device 10. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, software, hardware, or any combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas.

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
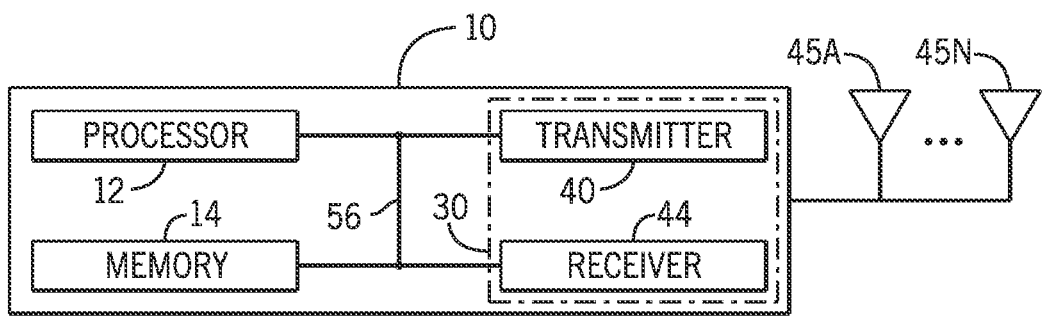
FIG. 2 is a functional block diagram of the electronic device of FIG. 1, according to embodiments of the present disclosure.

FIG. 2 is a functional block diagram of the electronic device 10 that may implement the components shown in FIG. 1 and/or the circuitry and/or components described in the following figures. As illustrated, the processor 12, the memory 14, the transceiver 30, the transmitter 40, the receiver 44, and/or the antennas 45 (illustrated as 45a-45n) may be communicatively coupled directly or indirectly (e.g., through or via another component, a communication bus, a network) to one another to transmit and/or receive data between one another.

The electronic device 10 may include the transmitter 40 and/or the receiver 44 that respectively enable transmission and reception of data between the electronic device 10 and a remote location via, for example, a network or direction connection associated with the electronic device 10 and an external transceiver (e.g., in the form of a cell, eNB (E-UTRAN Node B or Evolved Node B), base stations, and the like. As illustrated, the transmitter 40 and the receiver 44 may be combined into the transceiver 30. The electronic device 10 may also have one or more antennas 45a through 45n electrically coupled to the transceiver 30. The antennas 45a-45n may be configured in an omnidirectional or directional configuration, in a single-beam, dual-beam, or multi-beam arrangement, and so on. Each antenna 45 may be associated with a one or more beams and various configurations. In some embodiments, each beam, when implement as multi-beam antennas, may correspond to a respective transceiver 30. The electronic device 10 may include multiple transmitters, multiple receivers, multiple transceivers, and/or multiple antennas as suitable for various communication standards.

The transmitter 40 may wirelessly transmit packets having different packet types or functions. For example, the transmitter 40 may transmit packets of different types generated by the processor 12. The receiver 44 may wirelessly receive packets having different packet types. In some examples, the receiver 44 may detect a type of a packet used and process the packet accordingly. In some embodiments, the transmitter 40 and the receiver 44 may transmit and receive information via other wired or wireline systems or devices.

As illustrated, the various components of the electronic device 10 may be coupled together by a bus system 46. The bus system 46 may include a data bus, for example, as well as a power bus, a control signal bus, and a status signal bus, in addition to the data bus. The components of the electronic device 10 may be coupled together or accept or provide inputs to each other using some other mechanism.

Figure 3:
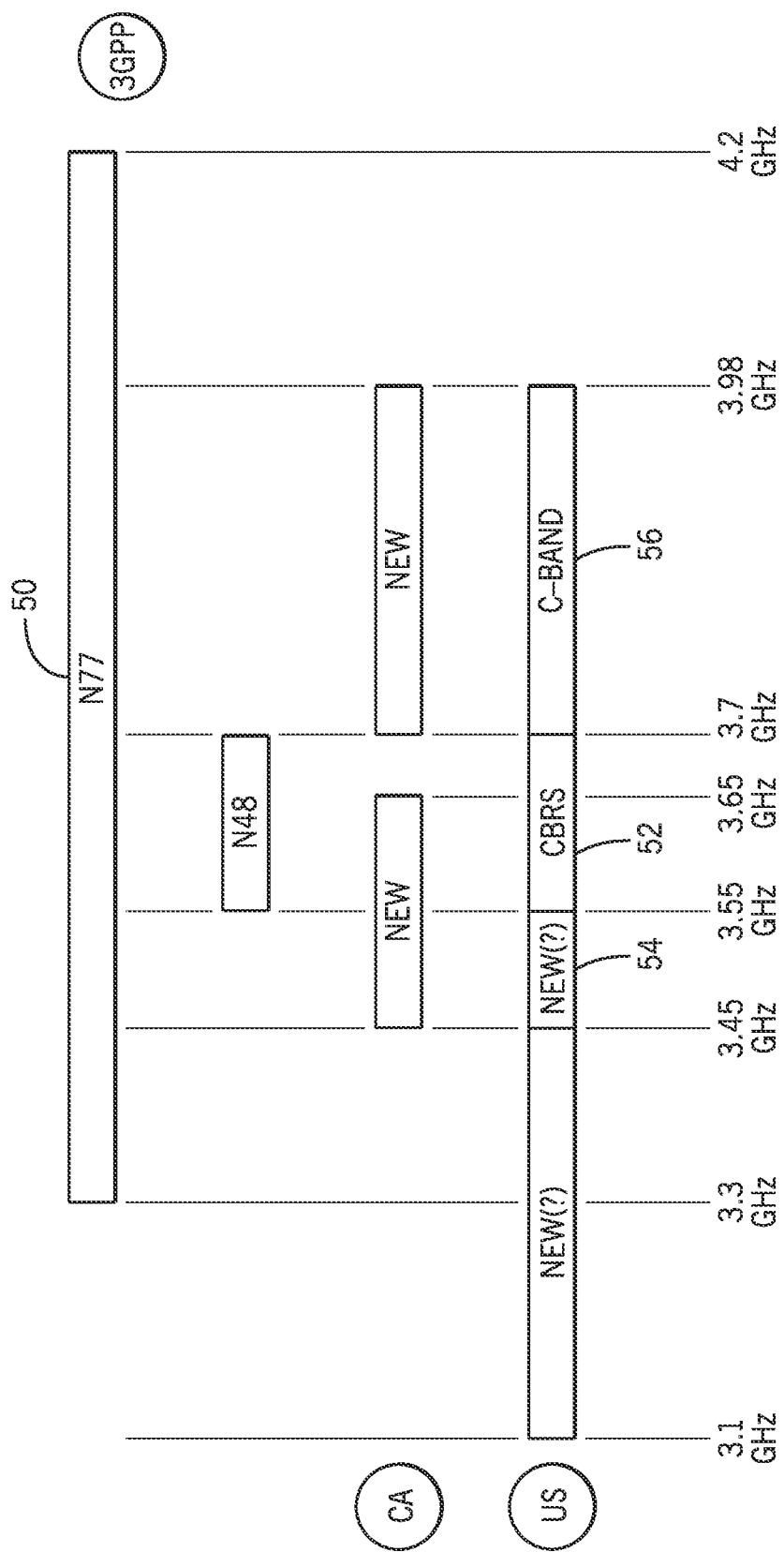
FIG. 3 is a frequency chart illustrating a frequency band and subranges of the frequency band, according to embodiment of the present disclosure.

As previously noted, the 3GPP may update frequency bands by expanding the frequency range covered by a frequency band, how a frequency band may be used, and so on. FIG. 3 is a frequency chart of a frequency band 50 (e.g., the n77 band) and subranges of the frequency band, according to embodiments of the present disclosure. In particular, the n77 band includes a subrange 52 between 3.55 GHz and 3.65 GHz (also referred to as the Citizens Broadband Radio Service (CBRS) band), a subrange 54 between 3.45 GHz and 3.55 GHz (also referred to as the 3.5 GHz subrange), and a subrange 56 between 3.7 GHz and 3.98 GHz (also referred to as the C-band), among others.

In the United States (U.S.), the FCC recently released new rules for the 3.5 GHz subrange 54 within the n77 band to allow for utilization of the subrange 54 in network communication, while current radio frequency requirements from the 3GPP restrict usage of the subrange 54 and limit the U.S. to the C-band 56. As such, while user equipment that is currently in use have been tested for compliance with the FCC rules with respect to the C-band 56, these user equipment may not been tested for compliance with the new FCC rules for the 3.5 GHz subrange 54, and thus are not permitted to use the 3.5 GHz subrange 54. A potential change of the 3GPP specification to permit usage of the 3.5 GHz subrange 54 in the n77 band for U.S. operation may lead to two different types of user equipment that support the n77 band in the U.S., those which also support the 3.5 GHz subrange 54 (e.g., because such user equipment has been tested for compliance with the new FCC rules for the 3.5 GHz subrange 54), and those that do not support the 3.5 GHz subrange 54. Because a network enabling communication on the n77 band may only assume that user equipment is operable on an entire frequency band (e.g., the n77 band) and not respective subranges of the frequency band (e.g., the C-band 56 vs. the 3.5 GHz subrange 54), the network not be able to distinguish between these two types of user equipment and would only realize that the user equipment does not support 3.5 GHz subrange 54 when performing a handover event (e.g., transferring network coverage of the user equipment from one base station to another base station) or requesting a secondary cell for carrier aggregation fails.

Figure 4:
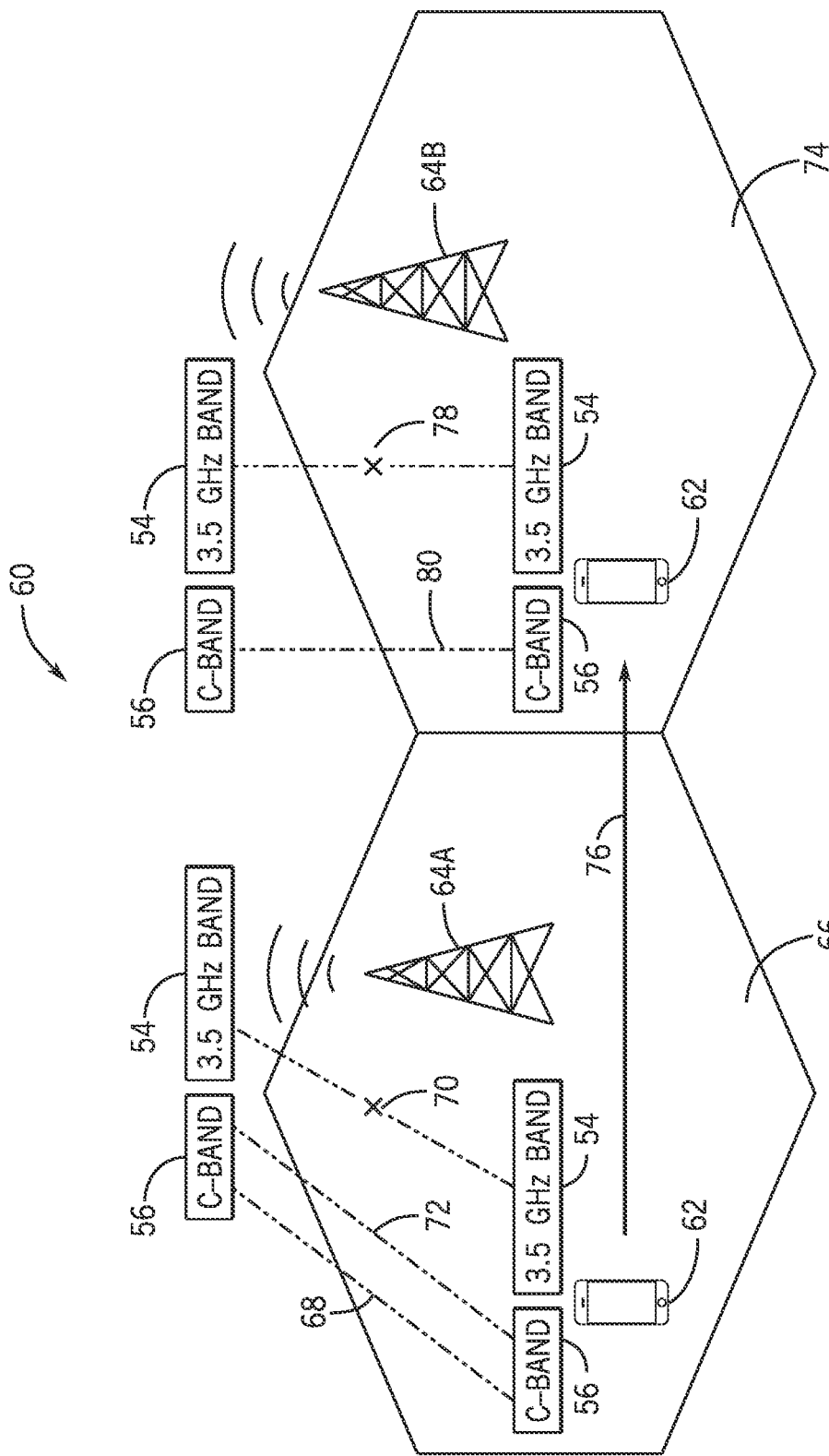
FIG. 4 is a diagram of a wireless communication network, according to embodiments of the present disclosure.

With the foregoing in mind, FIG. 4 is a diagram of a network 60 (e.g., a wireless communication network), according to embodiments of the present disclosure. In particular, the network 60 may provide network coverage to user equipment 62 over a channel in a supported frequency range or band (e.g., the n77 band) via one or more base stations 64A, 64B (collectively 64) within a coverage area 66. As shown in FIG. 3, the frequency band may include one or more frequency subranges (e.g. the CBRS band 52, the 3.5 GHz subrange 54, the C-band 56, and so on).

In particular, the base station 64 may broadcast a message on one or more supported frequency ranges or channels (e.g. in the n77 band) that are available to establish the connection to the user equipment 62 in the coverage area or cell 66. If the user equipment 62 also supports the one or more supported frequency ranges or channels (e.g., in the C-band 56 of the n77 band), then the user equipment 62 may respond, and the base station 64 may establish the connection to the user equipment 62 using a channel of the one or more supported frequency ranges or channels. As illustrated, the base station 64 may establish the connection to the user equipment 62 using a channel in the C-band 56. However, if the base station 64 is not aware of the subranges supported by the user equipment 62, and only associates the channel that the user equipment 62 operates on with the entire frequency band (e.g., the n77 band), then the base station 64 may perform a handover event or request a secondary cell for carrier aggregation based on the entire frequency band, instead of the subrange supported by the user equipment 62. If the user equipment 62 only supports the subrange (e.g., the C-band 56) of the frequency band (e.g., the n77 band) and not another subrange (e.g., the 3.5 GHz subrange 54) of the frequency band, then, if the handover event is performed or the secondary cell is implemented using the other subrange that is not supported by the user equipment 62, the handover event or the implementation of the secondary cell may fail. In such cases, the user equipment 62 may disconnect from the network 60, or the secondary cell may not be used by the user equipment 62, in which the user equipment 62 may not be able to use the full bandwidth allocated to it for communication.

The presently disclosed embodiments include enabling the base station 64 to send a system information block to the user equipment 62 having one or more network signaling (NS) flags/values to communicate the frequency subranges supported by the base station 64. According the 3GPP specification, the system information block is sent to all user equipment 62 in the coverage area 66, and the NS flags (which include eight integer value per frequency band) may indicate to the user equipment 62 the regional regulatory requirements apply the user equipment 62 in the coverage area 66. The user equipment 62 specification may define additional requirements which become applicable based on the NS flags. The user equipment 62 may establish communication with the base station 64 if the user equipment 62 supports the frequency band and the applicable NS flags. As such, in some embodiments, the NS flags may be used to indicate to the user equipment 62 the available frequency subranges (e.g., the C-band 56, the 3.5 GHz band 54, and so on) supported by the base station 64. In the example network of FIG. 4, the base station 64A may support both the C-band 56 and the 3.5 GHz band 54. Accordingly, the base station 64A may send a system information block with NS flags indicating that it supports the C-band 56 and the 3.5 GHz band 54 to the user equipment 62 in its coverage area 66.

The presently disclosed embodiments also include enabling the user equipment 62 to indicate to the base station 64 the frequency subranges indicated by the NS flags of the receive system information block that are in turn supported by the user equipment 62. In particular, the user equipment 62 may utilize one or more modified maximum power reduction (MPR) behavior bits to indicate the frequency subranges supported by the user equipment 62. The 3GPP specification provides that the MPR bits may specify an allowed decrease in maximum power transmitted by the user equipment 62 to enable the user equipment 62 to fulfill regional regulatory requirements (e.g., transmitter adjacent channel leakage ratio requirements). The 3GPP specification also provides that the modified MPR behavior bits may distinguish applicability of different A-MPR (Additional MPR) requirements for different types of user equipment 62 in particular frequency bands (e.g., n257 n260, and n261). In the disclosure embodiments, the user equipment 62 may set the modified MPR behavior bits corresponding to a frequency subrange (e.g., the C-band 56, the 3.5 GHz band 54, and so on) that the user equipment 62 supports to indicate to the base station 64 that the user equipment 62 supports the frequency subrange. In this manner, the base station 64 may be aware of and/or store the frequency subrange(s) supported by the user equipment 62, and perform a handover event or allocate a secondary cell based on the supported frequency subrange, instead of the entire frequency band (e.g., the n77 band), which may not be supported by the user equipment 62 in whole, thus preventing disconnection from the network 60 or a drop in bandwidth usage.

In the example network 60 of FIG. 4, the user equipment 62 may receive the system information block from the base station 64A indicating that the base station 64A supports both the C-band 56 and the 3.5 GHz band 54. However, the user equipment 62 may only support the C-band 56. As such, the user equipment 62 may set modified MPR behavior bits corresponding to the C-band 56, but not the 3.5 GHz band 54, and send the modified MPR behavior bits (e.g., in a message) to the base station 64A. Upon receipt of the modified MPR behavior bits, the base station 64A may establish a primary cell 68 with the user equipment 62 on the supported C-band 56. If the network 60 desires to perform carrier aggregation by establishing a secondary cell, the base station 64A may not establish a secondary cell 70 using the 3.5 GHz band 54, as the user equipment 62 has indicated that it does not support the 3.5 GHz band 54. Instead, the base station 64A may establish a secondary cell 72 using the C-band 56. Similarly, if the user equipment 62 moves to another coverage area 74, the base station 64A may perform a handover event 76 with a base station 64B that provides support to the other coverage area 74. In particular, the base station 64A may send an indication to the base station 64B of the frequency subrange(s) supported by the user equipment 62 (e.g., the C-band 56). Accordingly, the base station 64B may not establish connection 78 with the user equipment 62 using the 3.5 GHz band 54, as the user equipment 62 has indicated that it does not support the 3.5 GHz band 54. Instead, the base station 64B may establish connection 80 with the user equipment 62 using the C-band 56. Without this indication of user equipment-supported frequency subranges, the network 60 and base stations 64 may have attempted to establish the secondary cell 70 or performed the handover event 76 by establishing the connection 78 with the user equipment 62 using the unsupported 3.5 GHz band 54, resulting in decreased bandwidth usage or disconnection from the network 60.

Figure 5:
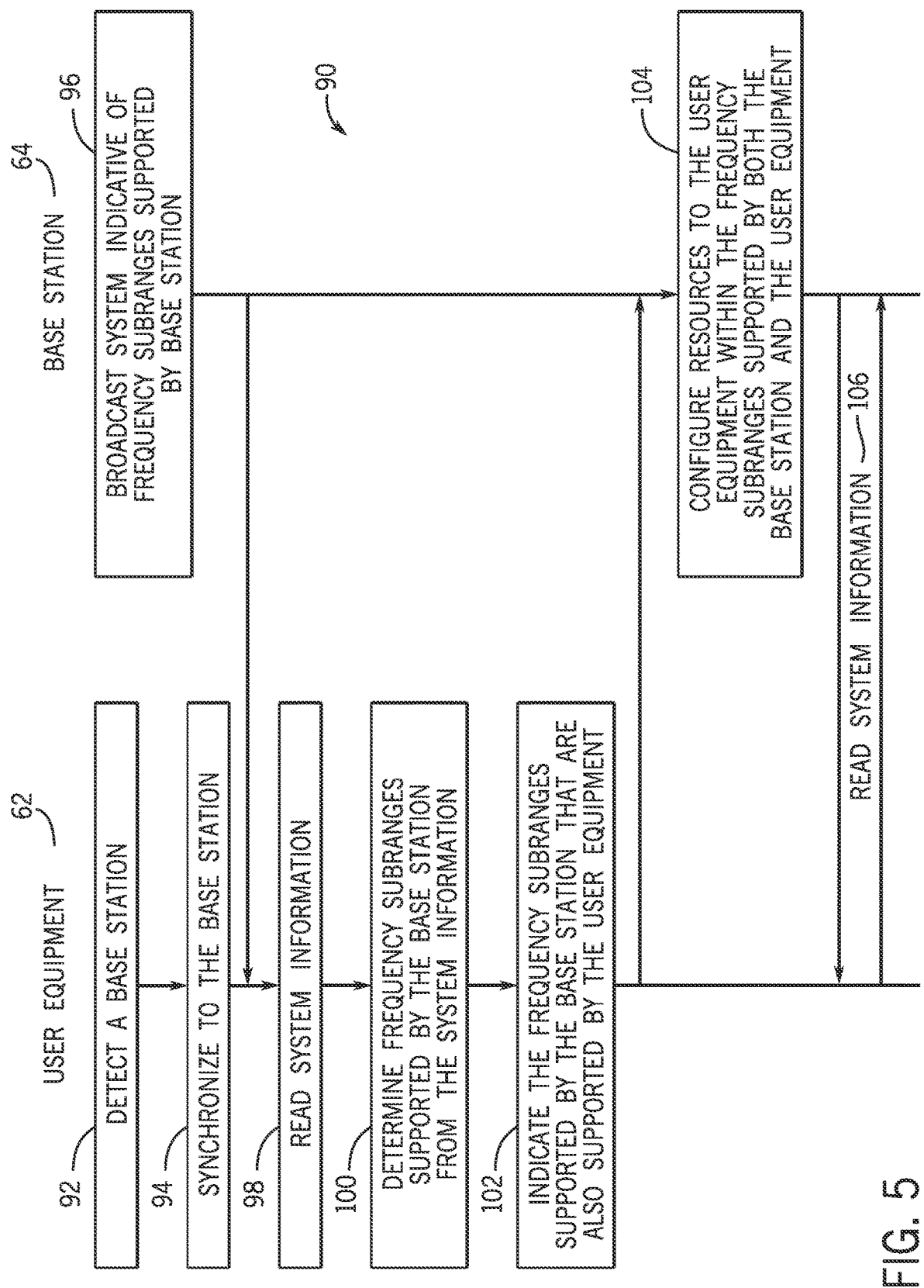
FIG. 5 is a flowchart of a method for configuring the transceiver of the user equipment to communicate with the wireless communication network of FIG. 4 using one or more frequency subranges, according to embodiments of the present disclosure.

FIG. 5 is a flowchart of a method 90 for configuring the transceiver 30 of the user equipment 62 to communicate with the wireless communication network 60 (e.g. including the base station 64A and/or the base station 64B) using one or more frequency subranges, according to embodiments of the present disclosure. Any suitable device (e.g., a controller) that may control components of the user equipment 62, the base station 64A and/or the base station 64B, and the terrestrial network, such as the processor 12 of each of these devices or systems, may perform the method 90. In some embodiments, the method 90 may be implemented by executing instructions stored in a tangible, non-transitory, computer-readable medium, such as the memory 14 or storage 16, using the processor 12. For example, the method 90 may be performed at least in part by one or more software components, such as an operating systems, one or more software applications, and the like, of the user equipment 62, the base station 64A and/or the base station 64B, and the terrestrial network. While the method 90 is described using steps in a specific sequence, it should be understood that the present disclosure contemplates that the described steps may be performed in different sequences than the sequence illustrated, and certain described steps may be skipped or not performed altogether.

At block 92, the user equipment 62 detects the base station 64. In particular, the user equipment 62 may detect the base station by receiving a radio frequency (RF) signal when the user equipment 62 enters the coverage area 66 of the base station 64. The RF signal may include timing alignment information, among other information. At block 94, the user equipment 62 synchronizes to the base station 64 by aligning its timing with the timing alignment information of the base station 64.

At block 96, the base station 64 broadcasts system information indicative of frequency subranges supported by the base station 64. In particular, the base station 64 may indicate the frequency subranges in the NS flags that are used to indicate the capabilities of the base station 64. For example, as illustrated in FIG. 4, the base station 64 may indicate the C-band 56 and the 3.5 GHz band 54 in one or more NS flags of the broadcasted system information.

At block 98, the user equipment 62 reads the system information, including the NS flags, received from the base station 64. The system information may additionally include timing specification, power specifications, Global Positioning System (GPS) coordinates, and/or any other applicable information. In some embodiments, the user equipment 62 may store the system information in the memory 14 for future usage.

At block 100, the user equipment 62 determines or receives the frequency subranges supported by the base station 64 from the system information block. By way of example, the one or more NS flags may include the C-band 56 and the 3.5 GHz band 54 of the n77 band. At block 102, the user equipment 62 indicates the frequency subranges supported by the base station 64 that are also supported by the user equipment 62. In particular, the user equipment 62 may set one or more indicator bits corresponding to one or more frequency subranges that are supported by the user equipment 62. In some embodiments, the indicator bits may include modified MPR behavior bits.

In one embodiment, the NS flags for the n77 band may include a new NS flag ("NS_X") corresponding to the 3.5 GHz subrange 54. For the new NS flag, the value for the A-MPR may be set to 0 decibels (thus rendering the NS flag irrelevant for purposes of MPR operation). A modified MPR behavior bit corresponding to the new NS flag may be defined, such that setting the modified MPR behavior bit indicates that the user equipment 62 supports the 3.5 GHz subrange 54. If the user equipment 62 does not set the modified MPR behavior bit, then the user equipment 62 is indicating that it does not support the 3.5 GHz subrange 54. In some embodiments, the modified MPR behavior bit may correspond directly to 3.5 GHz subrange 54. That is the 3GPP may define the modified MPR behavior bit to correspond directly to the n77 band, such that if the user equipment 62 sets the modified MPR behavior bit, then it implies that the user equipment 62 supports the 3.5 GHz subrange 54. If the user equipment 62 does not set the modified MPR behavior bit, then it implies that the user equipment 62 does not support the 3.5 GHz subrange 54 (e.g. the user equipment 62 only supports the 3.7-3.98 GHz subrange). In such embodiments, the user equipment 62 may not receive a corresponding NS flag and/or setting the A-MPR to 0 decibels to indicate support for the 3.5 GHz subrange 54 may be avoided. While this embodiment refers to the 3.5 GHz subrange 54, it should be understood that any suitable frequency subrange of a frequency band, and particularly newly introduced subranges to existing frequency bands, are contemplated.

At block 104, the base station 64 configures its resources to the user equipment 62 within the frequency subranges supported by the user equipment 62 and the base station 64. Once the resources are configured and a connection is established between the user equipment 62 and the base station 64, the user equipment 62 and the base station 64 may send and receive user data 106 over the frequency subrange. In this manner, the method 90 may enable the user equipment to configure the transceiver 30 to conform to one or more applicable subrange of frequencies and communicate with a terrestrial network (e.g., including the base station 64 and/or the base station 64B).

As discussed above, modifications and/or updates to the standards or regulations regarding non-federal networks and an implementation of the user equipment 62. The CBRS power backoff may be referred to as a lower power mode, while the default power backoff may be referred to as a default power mode. Moreover, while the lower power mode refers to a greater power backoff than the default power backoff, it should be understood that the lower power mode, in other applications, may refer to any suitable power characteristics that cause the user equipment 62 to operate at less power than the default power mode, include decreased transmission power, decreased reception power, less maximum transmission power, less maximum reception power, and so on.

Table 1 below, provided by 3GPP Technical Specification (TS) 38.101-1, illustrates different CBRS power backoff values (e.g., depending on, there are different cases A1-A8) that may be applied by the user equipment 62. The numbers below are described in decibels (dB) as an amount of power that the user equipment 62 may backoff to meet regulatory requirements. Table 1 is specific to the CBRS band requirements.

TABLE 1

| Modulation/Waveform | | A1 Outer | A2 Outer | A3 Outer/ Inner | A4 Outer/ Inner | A5 Outer/ Inner | A6 Outer/ Inner | A7 Outer/ Inner | A8 Outer/ Inner |
|---|---|---|---|---|---|---|---|---|---|
| DFT-s-OFDM | PI/2 BPSK | [4.5] | [6] | 4 | 4 | 4 | 4 | 10.5 | 4 |
| | QPSK | [4.5] | [6] | 4 | 4 | 4 | 4 | 10.5 | 4 |
| | 16 QAM | [4.5] | [6] | 5 | 4 | 5 | 4 | 11 | 4 |
| | 64 QAM | [4.5] | [6] | 5 | 4 | 5 | 4 | 11 | 4 |
| | 256 QAM | | [6] | | | | | 11 | |
| CP-OFDM | QPSK | [5.5] | [7] | 6 | 4 | 6 | 4 | 11.5 | 4 |
| | 16 QAM | [5.5] | [7] | 6 | 4 | 6 | 4 | 11.5 | 4 |
| | 64 QAM | [5.5] | [7] | 6 | 4 | 6 | 4 | 11.5 | 4 |
| | 256 QAM | | [7] | | | | | 11.5 | | frequency bands may lead to inefficiencies. Initially, the 3.5 GHz band 54 was utilized by federal incumbent users. The 3.5 GHz band 54 is situated adjacent to the CBRS band 52 (3.55-3.7 GHz). To avoid interfering with the federal users, stricter requirements were introduced for the CBRS band 52 by the FCC. In particular, the FCC currently enforces a power backoff of the user equipment 62 using the CBRS band 52 (the "CBRS power backoff") that is greater or "stricter" than a power backoff of the user equipment 62 when not using the CBRS band 52 (a "default power backoff"). The 3GPP has defined the power backoff as a maximum power by which the user equipment 62 is to back off (e.g., when approaching a power threshold, to meet out-of-band emission levels, and so on), while an actual power backoff value may be smaller and/or may depend on By comparison, Table 2 below, also provided by 3GPP TS 38.101-1, illustrates different default power backoff values that may be applied by the user equipment 62. In particular, the default power backoff values in Table 2 are applicable when there are no conditions that exist to operate under the CBRS band requirements, and have lower power backoff values than that of the CBRS power backoff values. That is, the user equipment 62 may still be allowed to backoff its power, but not to the same degree as the CBRS power backoff values, and, in some cases, not at all. Accordingly, the lower default power backoff values enable the user equipment 62 to operate at higher transmission and/or reception power, and thus with better performance, then when operating using the higher CBRS power backoff values.

TABLE 2

| | | MPR (dB) | | |
|---|---|---|---|---|
| | Modulation | Edge RB allocations | Outer RB allocations | Inner RB allocations |
| DFT-s-OFDM | Pi/2 BPSK | ≤3.5 | ≤1.2 | ≤0.2 |
| | | ≤0.5 | ≤0.5 | 0 |
| | Pi/2 BPSK w Pi/2 BPSK DMRS | ≤0.5 | ≤0 | 0 |
| | QPSK | | ≤1 | 0 |

TABLE 2-continued

| Modulation | | MPR (dB) | |
| --- | --- | --- | --- |
| | | Edge RB allocations | Outer RB allocations | Inner RB allocations |
| | 16 QAM | ≤2 | | ≤1 |
| | 64 QAM | | ≤2.5 | |
| | 256 QAM | | ≤4.5 | |
| CP-OFDM | QPSK | ≤3 | | ≤1.5 |
| | 16 QAM | ≤3 | | ≤2 |
| | 64 QAM | | ≤3.5 | |
| | 256 QAM | | ≤6.5 | |

As discussed above, the FCC recently allowed non-federal networks and users to use the 3.5 GHz subrange 54 in coverage areas where federal users are not using the subrange. That is, the non-federal networks may be deployed using the 3.5 GHz subrange 54 in coverage areas where there are no federal users utilizing the 3.5 GHz subrange 54. Accordingly, in the case where user equipment 62 is using the CBRS band 52, and the user equipment 62 is not located in or adjacent to a coverage area where there are federal users using the 3.5 GHz subrange 54, then the user equipment 62 may not operate to its full communication potential or efficiency, as the FCC regulations may force it to operate with a greater power backoff (e.g., under the assumption that there are only federal users in the 3.5 GHz subrange 54).

Figure 6:
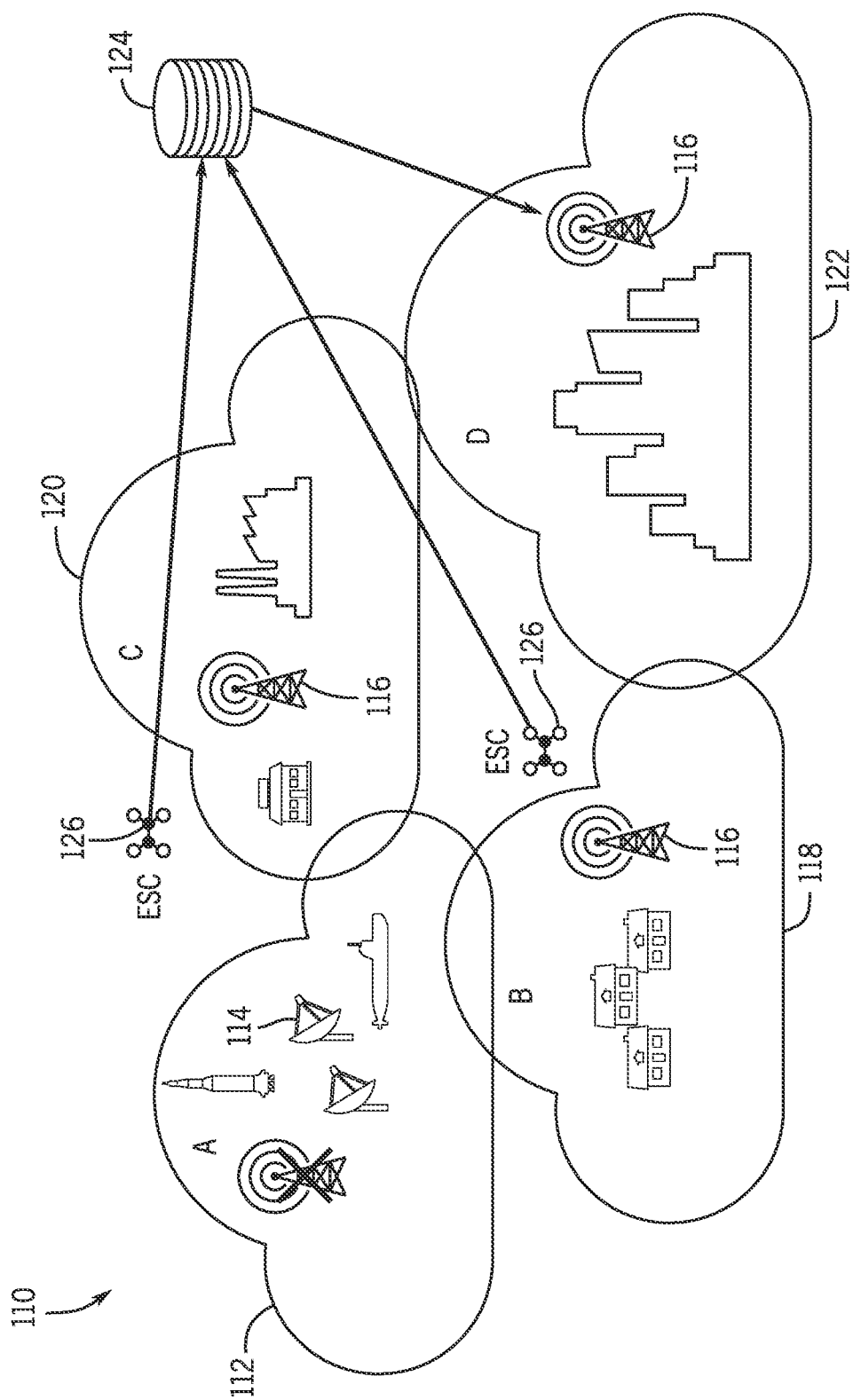
FIG. 6 is diagram of network coverage provided by a wireless communication network, according to embodiments of the present disclosure.

With the foregoing in mind, FIG. 6 is a diagram of network coverage provided by a wireless communication network 110, according to embodiments of the present disclosure. Coverage Area A 112 may include federal users 114 using the 3.5 GHz band 54. As such, per FCC regulations, there may be no deployment of non-federal networks 116 (e.g., a cellular network as provided by a network operator to users other than federal users 114 via one or more base stations) operating on the 3.5 GHz band and/or the CBRS band 52 within Coverage Area A 112. The federal users 114 may be those defined as "federal incumbent users" by the FCC and/or 47 C.F.R. § 96.15. Coverage Area B 118 and Coverage Areas C 120 may include non-federal users connecting to a non-federal network 116 operating on the 3.5 GHz band and/or the CBRS band 52. To operate on the CBRS band 52 in Coverage Area B 118 and Coverage Area C 120, user equipment 62 may operate under the lower or CBRS power mode (e.g., employing the CBRS power backoff) due to both coverage areas neighboring Coverage Area A 112. Coverage Area D 122 may also include non-federal users connecting to a non-federal network 116 operating on the 3.5 GHz band and/or the CBRS band 52.

Since Coverage Area D 122 borders only two coverage areas (e.g., Coverage Area B 118 and Coverage Area C 120), and each neighboring coverage area has a non-federal network 116 operating in the 3.5 GHz band 54 or the CBRS band 52, there is no need for the user equipment 62 to operate on the CBRS band 52 under the lower or CBRS power mode (e.g., employing the CBRS power backoff) since it may be safely assumed that Coverage Area D 122 does not border a coverage area with federal users 114. Thus, to determine if user equipment 62 in a coverage area may operate under the default power mode (e.g., employing the default power backoff) on the CBRS band 52, a Spectrum Access System (SAS) controller 124 may utilize one or more environmental sensing capability sensors (ESC) 126 to identify the presence and coverage area of non-federal networks (e.g., non-federal network deployments) 116 operating in the 3.5 GHz band 54 or the CBRS band 52 to determine the presence and coverage areas of federal users 114 operating on the 3.5 GHz band 54. The SAS controller 124 may include an automated frequency coordinator that manages radio frequency wave sharing on a dynamic, as-needed basis across multiple tiers of access (e.g., federal incumbent users, priority access license users, and general authorized access users). The environmental sensing capability sensors 126 may include a network of sensors utilized to detect non-federal or federal frequency use in particular frequency subranges (e.g. 3.5 GHz to 3.65 GHz).

In particular, if the environmental sensing capability sensors 126 do not detect any non-federal networks 116 using the 3.5 GHz band 54 or the CBRS band 52 within the coverage area (e.g., Coverage Area A 114), the SAS controller 124 may assume that there are federal users 114 in the coverage area. Accordingly, the SAS controller 124 may prevent or block non-federal networks 116 and user equipment 62 attempting to use the non-federal networks 116 from operating on the 3.5 GHz band 54 and the CBRS band 52 in the coverage area. On the other hand, if the environmental sensing capability sensors 126 detect non-federal networks 116 using the 3.5 GHz band 54 or the CBRS band 52 within a coverage area (e.g., Coverage Area B 118), the SAS controller 124 may determine that there are no federal users 114 within that coverage area. Moreover, if the environmental sensing capability sensors 126 detect that there are no non-federal networks 116 using the 3.5 GHz band 54 or the CBRS band 52 within a neighboring coverage area (e.g., Coverage Area A 114) of the coverage area, the SAS controller 124 may assume that there are federal users 114 in the neighboring coverage area. Accordingly, the SAS controller 124 may communicate to the non-federal network 116 within the coverage area to indicate to user equipment 62 that operating on the CBRS band 52 is permissible if using the CBRS power backoff. The 3.5 GHz band 54 currently has no such restriction imposed on it by standards and/or regulation bodies.

Additionally, if a coverage area (e.g., Coverage Area D 122) has non-federal networks 116 using the 3.5 GHz band 54 or the CBRS band 52 and is bordered only by coverage areas having non-federal networks 116 (e.g., Coverage Area B 118 and Coverage Area C 120) using the 3.5 GHz band 54 or the CBRS band 52, then the SAS controller 124 may communicate to the non-federal network 116 within the coverage area to indicate to user equipment 62 that operating on the CBRS band 52 using the default power mode is permissible (e.g., the user equipment 62 may use the default power backoff, and need not operate under the CBRS power mode and use the CBRS power backoff). It should be understood that default power mode may refer to applying the default power backoff as specified by regulatory or standards bodies when operating outside of the CBRS band 52, such as that shown above in Table 2. Again, the 3.5 GHz band 54 currently has no such restriction imposed on it by standards and/or regulation bodies. In this manner, the user equipment 62 using the CBRS band 52 may operate to its full communication potential or efficiency.

Figure 7:
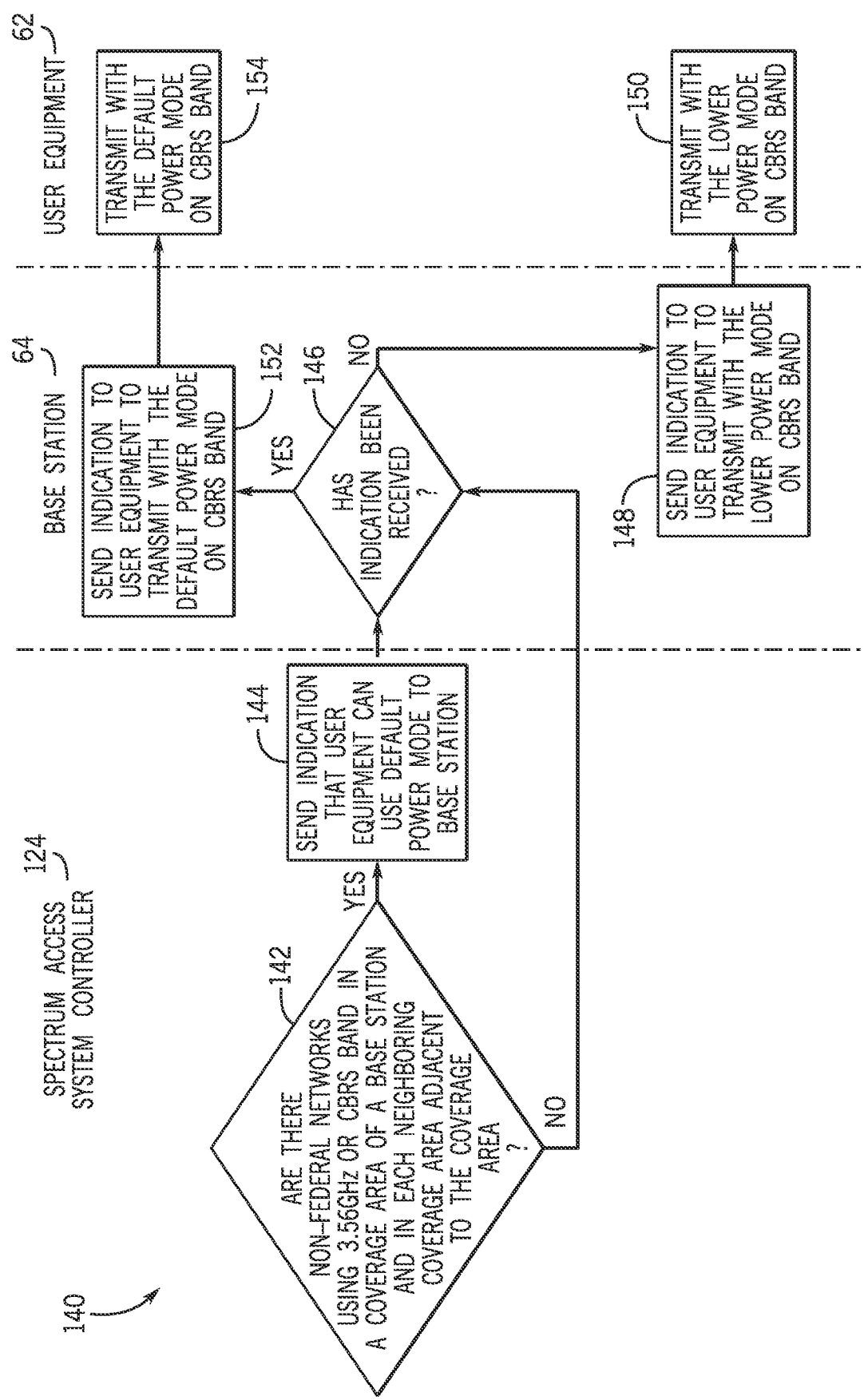
FIG. 7 is a flowchart of a method for determining whether user equipment may operate without restriction on a restricted frequency band, according to embodiments of the present disclosure.

With the foregoing in mind, FIG. 7 is a flowchart of a method 140 for determining whether the user equipment 62 may operate without restriction (e.g., operate under the default power mode with the default power backoff) on a restricted frequency band (e.g., the CBRS band 52), according to embodiments of the present disclosure. Any suitable device (e.g., a controller) that may control components of the user equipment 62, the base station 64, the non-federal networks 116, the SAS controller 124, and/or the environmental sensing capability sensors 126, such as the processor 12 of each of these devices or systems, may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components, such as an operating systems, one or more software applications, and the like, of the user equipment 62, the base station 64, the non-federal networks 116, the SAS controller 124, and/or the environmental sensing capability sensors 126. While the method 140 is described using steps in a specific sequence, it should be understood that the present disclosure contemplates that the described steps may be performed in different sequences than the sequence illustrated, and certain described steps may be skipped or not performed altogether.

At block 142, the SAS controller 124 determines whether there are non-federal networks 116 using the 3.5 GHz band 54 or the CBRS band 52 in a coverage area of the base station 64 and in each neighboring coverage areas adjacent to the coverage area. In particular, the SAS controller 124 may utilize the environmental sensing capability sensors 126 to detect if there are non-federal networks 116 using the 3.5 GHz band 54 or the CBRS band 52 in the coverage area and the neighboring coverage areas. If the environmental sensing capability sensors 126 detect non-federal networks 116 using the 3.5 GHz band 54 or the CBRS band 52 in a coverage area, the SAS controller 124 may determine that there are no federal users 114 in the coverage area. On the other hand, if the environmental sensing capability sensors 126 do not detect any non-federal networks 116 using the 3.5 GHz band 54 or the CBRS band 52 in a coverage area, the SAS controller 124 may determine that there are federal users 114 in the coverage area. As described above, there may not be any non-federal networks 116 on either the 3.5 GHz band 54 or the CBRS band 52 when federal users 114 are present within a coverage area.

If the SAS controller 124 determines there are non-federal networks 116 using the 3.5 GHz band 54 or the CBRS band 52 in the coverage area of the base station 64 and in the neighboring coverage areas adjacent to the coverage area, then, at block 144, the SAS controller 124 sends an indication to the base station 64 that user equipment 62 connected to the base station 64 may use the default power mode. For example, in FIG. 6, there are non-federal networks 116 in Coverage Area D 122 and its neighboring coverage areas (e.g., Coverage Area B 118 and Coverage Area C 120). As such, the SAS controller 124 may send an indication to the non-federal network 116 in Coverage Area D that the user equipment 62 connected to the non-federal network 116 may use the default power mode.

After the SAS controller 124 sends the indication to the base station 64 that the user equipment 62 connected to the base station 64 may use the default power mode in block 144, or if the SAS controller 124 determines there are non-federal networks 116 using the 3.5 GHz band 54 or the CBRS band 52 in the coverage area of the base station 64 and in the neighboring coverage areas adjacent to the coverage area in block 142, then, at block 146, the base station determines if the indication that the user equipment 62 may use the default power mode has been received. For example, the SAS controller 124 may determine that there are no non-federal networks 116 using the 3.5 GHz band 54 or the CBRS band 52 in Coverage Area A 112 of FIG. 6.

At block 148, if the base station 64 has not received the indication that user equipment 62 may use the default power mode, then the base station 64 sends an indication to the user equipment 62 to transmit using the lower or CBRS power mode when using the CBRS band 52. For example, the base station may set a network signaling value (e.g., network signaling value 27 or NS27 per the 3GPP standard) corresponding to operating using the lower or CBRS power mode that is sent to the user equipment 62 in a system information block. At block 150, the user equipment 62 transmits data using the CBRS power mode on the CBRS band 52. That is, the user equipment 62 may configure its transmitter 40 to use the CBRS power backoff when transmitting data on the CBRS band 52.

At block 152, if the base station 64 received the indication that user equipment 62 may use default power, then the base station 64 sends an indication to the user equipment 62 to transmit with the default power mode on the CBRS band 52. In some embodiments, the indication may include a lack of setting a network signaling value (e.g., the NS27 value) corresponding to operating using the CBRS power mode in a system information block sent to the user equipment 62. The lack of setting the network signal value removal of the restrictions flag may lead to improved network performance through the allowance of less power backoff as offered by the default power mode when operating on the CBRS band 52. At block 154, the user equipment 62 transmits data using the default power mode on the CBRS band 52. That is, the user equipment 62 may configure its transmitter 40 to use the default power mode when transmitting data on the CBRS band 52.

Additionally, a new 6 GHz band has recently been allocated by different countries for network operation. Almost all countries have allocated the new 6 GHZ band (or parts thereof), for unlicensed network operation. As a result, most countries have slightly different regulatory requirements for the new 6 GHz band which may need to be addressed when initializing network communication.

Figure 8:
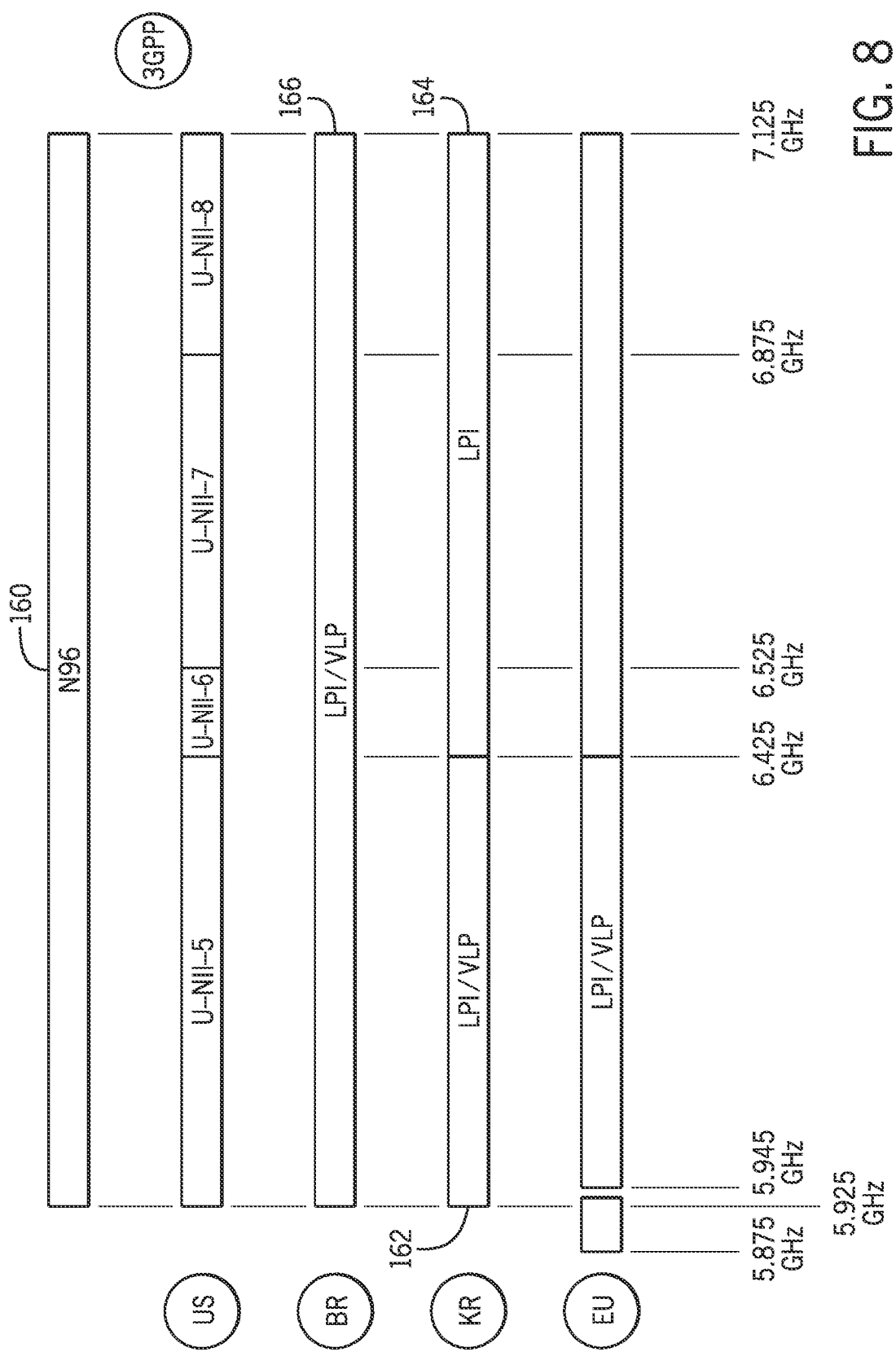
FIG. 8 is a frequency diagram of frequency-delineated regulatory requirements for different countries, according to embodiments of the present disclosure.

With the foregoing in mind, FIG. 8 is a frequency diagram of frequency-delineated regulatory requirements for different countries, according to embodiments of the present disclosure. As illustrated, different countries may have different regulatory requirements for different subranges of a frequency band 160 (e.g., the 6 GHz frequency band). In some cases, these subranges corresponding to different regulatory requirements in different countries may overlap. By way of example, Korea (KR) has a first regulatory requirement 162 for the frequency range between 5.925 GHz and 6.425 GHz to operate on a Low-Power Indoor (LPI) mode or Very Low Power (VLP) mode, and a second regulatory requirement 164 for the frequency range between 6.425 GHz and 7.125 GHz to operate on the LPI mode. However, Brazil (BR) has a regulatory requirement 166 for the entire frequency range between 5.925 GHz and 7.125 GHz to operate on the LPI mode or the VLP mode. Moreover, a regulatory requirement in one country may be different than the same regulatory requirement in another country. That is, the LPI mode in Korea may limit maximum transmission power to a power value that is different than that of the LPI mode in Brazil.

To enable user equipment 62 to operate under the appropriate regulatory requirement, a base station 64 may send the user equipment 62 a network signaling value corresponding to the appropriate regulatory requirement. The user equipment 62 may then receive or determine the regulatory requirement based on the network signal value, and operate under the regulatory requirement. However, even though networks signaling values are specific to each frequency band (e.g., 160), each frequency band 160 is typically allotted only eight network signaling values. Because each country has different regulatory requirements, and even the same regulatory requirements are different in different countries, eight network signaling values may not be sufficient to cover all the different possible regulatory requirements.

Figure 9:
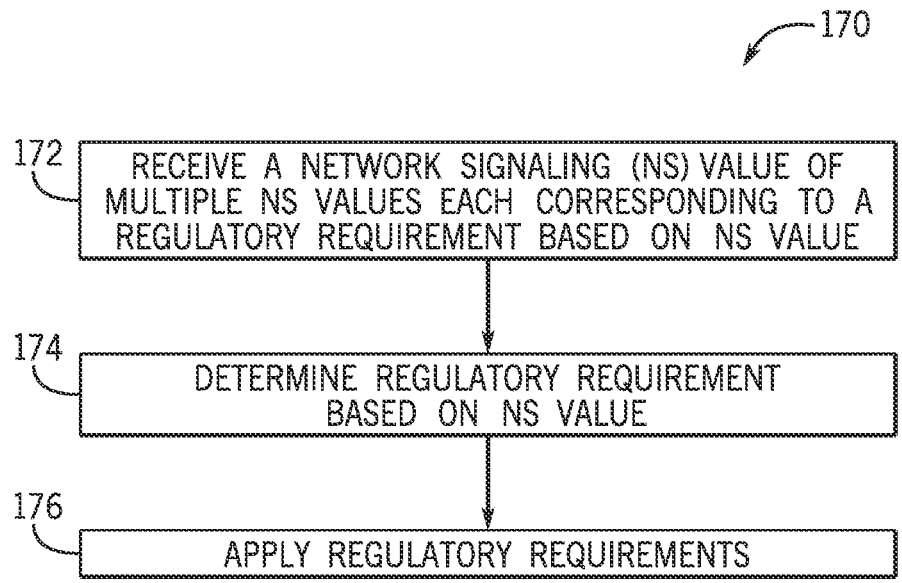
FIG. 9 is a flowchart of a method for receiving or determining the frequency-delineated regulatory requirements of FIG. 8 for a country based on having greater than eight network signaling values, according to embodiments of the present disclosure.

With the foregoing in mind, FIG. 9 is a flowchart of a method 170 for receiving or determining the frequency-delineated regulatory requirements of FIG. 8 for a country based on having greater than eight network signaling values, according to embodiments of the present disclosure. Any suitable device (e.g., a controller) that may control components of the user equipment 62, such as the processor 12 of each of these devices or systems, may perform the method 170. In some embodiments, the method 170 may be implemented by executing instructions stored in a tangible, non-transitory, computer-readable medium, such as the memory 14 or storage 16, using the processor 12. For example, the method 170 may be performed at least in part by one or more software components, such as an operating systems, one or more software applications, and the like, of the user equipment 62. While the method 170 is described using steps in a specific sequence, it should be understood that the present disclosure contemplates that the described steps may be performed in different sequences than the sequence illustrated, and certain described steps may be skipped or not performed altogether.

In some embodiments, the network signaling values are increased greater than eight values. In particular, the number of network signaling values may be at least the number of different regulatory requirements for the different countries. With this in mind, at block 172, the user equipment 62 receives or determines a network signaling value of multiple network signaling values each corresponding to a regulatory requirement of a geographical region. As described above, there may be more than eight network signaling values for the frequency band on which the user equipment 62 may be operating (e.g., the 6 GHz frequency band 160). At block 174, the user equipment 62 receives or determines a regulatory requirement based on the network signaling value. The user equipment 62 may store a table of different regulatory requirements and the associated network signaling value corresponding to each regulatory requirement. In some embodiments, each network signaling value may correspond to a regulatory requirement for a subrange of the designated frequency band (e.g. VLP/LPI for 5.945 GHz to 6.425 GHz in Korea). At block 176, the user equipment 62 applies the regulation requirement determined from the network signaling value. In this manner, the method 170 may enable the user equipment 62 to determine the frequency-delineated regulatory requirements for a country based on having greater than eight network signaling values.

Figure 10:
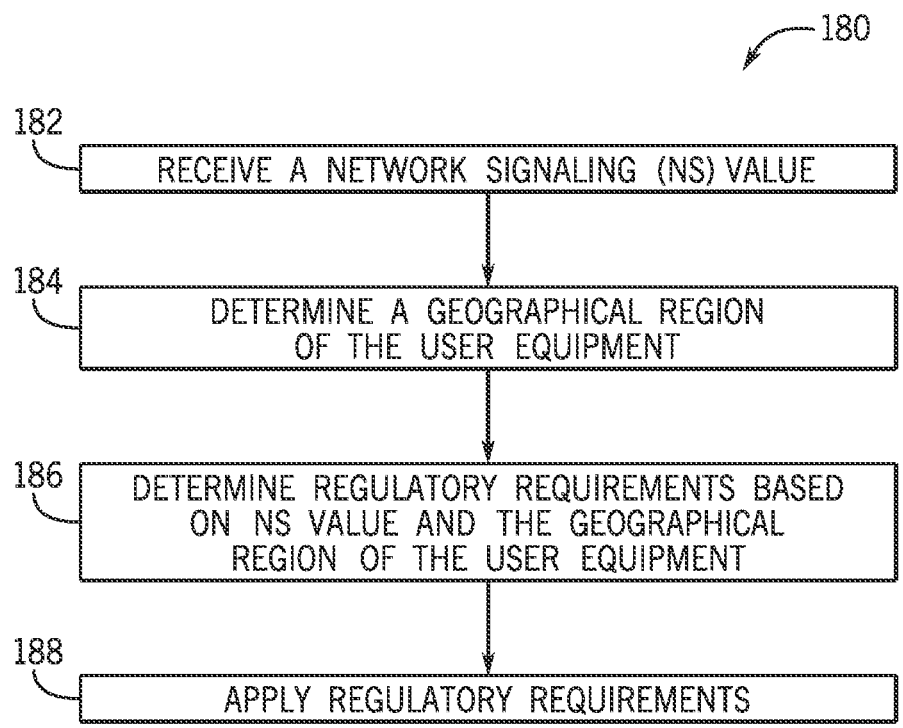
FIG. 10 is a flowchart of a method for determining the frequency-delineated regulatory requirements of FIG. 8 for a country based on region-dependent network signaling values, according to embodiments of the present disclosure.

Additionally or alternatively, the regulatory requirement may be based on the network signaling value and an indication of a geographical region (e.g., a country). FIG. 10 is a flowchart of a method 180 for determining the frequency-delineated regulatory requirements of FIG. 8 for a country based on region-dependent network signaling values, according to embodiments of the present disclosure. Any suitable device (e.g., a controller) that may control components of the user equipment 62, such as the processor 12 of each of these devices or systems, may perform the method 180. In some embodiments, the method 170 may be implemented by executing instructions stored in a tangible, non-transitory, computer-readable medium, such as the memory 14 or storage 16, using the processor 12. For example, the method 180 may be performed at least in part by one or more software components, such as an operating systems, one or more software applications, and the like, of the user equipment 62. While the method 180 is described using steps in a specific sequence, it should be understood that the present disclosure contemplates that the described steps may be performed in different sequences than the sequence illustrated, and certain described steps may be skipped or not performed altogether.

At block 182, the user equipment 62 receives a network signaling value (e.g., out of eight possible network signaling values). At block 184, the user equipment 62 receives or determines a geographical region of the user equipment 62. In some embodiments, the user equipment 62 may use a location sensor (e.g., a Global Navigation Satellite System (GNSS) sensor such as a Global Positioning System (GPS) Sensor) to receive or determine the geographical region. In additional or alternative embodiments, the user equipment 62 may utilize a network operator's Public Land Mobile Network (PLMN) value to receive or determine the geographical region. That is, the PLMN may be a combination of mobile communication services offered by a network operator in a specific country. The user equipment 62 may store a table that correlates geographical regions to PLMN values. When the user equipment 62 connects to a base station 64, the user equipment 62 may receive a PLMN value associated with the network operator. By referencing the table using the PLMN value, the user equipment 62 may identify the geographical region where the base station 64 (and thus the user equipment 62) is located.

At block 186, the user equipment 62 receives or determines a regulatory requirement based on the network signaling value and the geographical region. The user equipment 62 may store a table of different regulatory requirements for each geographical region, and the associated network signaling value corresponding to each regulatory requirement of a respective geographical region. In particular, the same network signaling values may be used to correspond to different regulatory requirements in different regions. At block 188, the user equipment 62 applies the regulatory requirement determined from the network signaling value and the geographical region. In this manner, the method 180 may enable the user equipment 62 to determine the frequency-delineated regulatory requirements for a country based on region-dependent network signaling values.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method for operating user equipment, comprising:
receiving, at a receiver of the user equipment, a system information block from a base station comprising a network signaling value of greater than eight network signaling values corresponding to greater than eight regulatory requirements of a plurality of geographical regions;
receiving, using processing circuitry of the user equipment, an indication of a regulatory requirement of the greater than eight regulatory requirements of a geographical region of the plurality of geographical regions stored in memory of the user equipment corresponding to the network signaling value; and
configuring, using the processing circuitry of the user equipment, a transmitter or the receiver of the user equipment to comply with the regulatory requirement.

2. The method of claim 1, wherein the regulatory requirement is associated with a frequency between 5.925 gigahertz and 7.125 gigahertz.

3. A method for operating user equipment in a geographical region, comprising:
receiving, at a receiver of the user equipment, a system information block from a base station, the system information block comprising a network signaling value of a plurality of network signaling values corresponding to a plurality of regulatory requirements of the geographical region;
determining, based on the network signaling value, a maximum power reduction (MPR) bit;
receiving, using processing circuitry of the user equipment, a first indication of the geographical region that the user equipment is located;
receiving, using the processing circuitry of the user equipment, a second indication of a regulatory requirement of the plurality of regulatory requirements stored in memory of the user equipment corresponding to the network signaling value and based on the geographical region; and
configuring, using the processing circuitry of the user equipment, a transmitter or the receiver of the user equipment to comply with the regulatory requirement by adjusting one or more parameters of the transmitter or the receiver based on the MPR bit.

4. The method of claim 3, wherein the first indication of the geographical region is received from a location sensor of the user equipment.

5. The method of claim 3, wherein receiving, using the processing circuitry of the user equipment, the second indication of the geographical region comprises receiving a Public Land Mobile Network value from the base station.

6. The method of claim 3, wherein the regulatory requirement is associated with an unlicensed frequency band.

7. The method of claim 3 comprising determining, based on the first indication and the second indication, a Citizens Broadband Radio Service (CBRS) power backoff value.

8. The method of claim 7, wherein configuring the transmitter or the receiver of the user equipment to comply with the regulatory requirement comprises adjusting the one or more parameters of the transmitter or the receiver based on the CBRS power backoff value, additional MPR bits, transmitter adjacent channel leakage ratio requirements, or any combination thereof.

9. User equipment, comprising:
a transceiver; and
processing circuitry communicatively coupled to the transceiver, the processing circuitry configured to
receive an indication of a regulatory requirement stored in memory of the user equipment based on a network signaling value sent by a base station, the memory being configured to store a corresponding network signaling value of a plurality of network signaling values for each regulatory requirement of a plurality of regulatory requirements of a plurality of geographical regions, and
configure the transceiver to comply with the regulatory requirement.

10. The user equipment of claim 9, wherein the plurality of network signaling values comprises greater than eight network signaling values.

11. The user equipment of claim 9, wherein the processing circuitry is configured to receive, using the transceiver, a system information block from the base station that includes the network signaling value.

12. The user equipment of claim 9, wherein the regulatory requirement corresponds to a frequency range of a plurality of frequency ranges supported by the base station, the plurality of frequency ranges being within a frequency band.

13. The user equipment of claim 9, wherein the processing circuitry is configured to determine the regulatory requirement based on the network signaling value and a geographical region of the user equipment, and the plurality of geographical regions comprising the geographical region.

14. The user equipment of claim 13, comprising a location sensor, the processing circuitry being configured to determine the geographical region of the user equipment using the location sensor.

15. The user equipment of claim 13, wherein the processing circuitry is configured to determine the geographical region of the user equipment based on a Public Land Mobile Network value sent by the base station.

16. The user equipment of claim 9, wherein the memory is configured to store a corresponding Public Land Mobile Network value for each geographical region of the plurality of geographical regions.

17. The user equipment of claim 9, wherein the processing circuitry is configured to determine the regulatory requirement when initializing network communication with the base station.

18. The user equipment of claim 9, wherein the network signaling value corresponds to different regulatory requirements in different geographical regions of the plurality of geographical regions.

19. The user equipment of claim 9, wherein the regulatory requirement corresponds to different transmission power limits in different geographical regions of the plurality of geographical regions.

20. The user equipment of claim 9, wherein the network signaling value is sent by the base station using a frequency band with a plurality of frequency ranges that are supported by the base station.

* * * * *